Aug. 6, 1929.　　C. CHRISTIANSEN　　1,723,467
TINE REENFORCING MEANS
Filed April 30, 1928
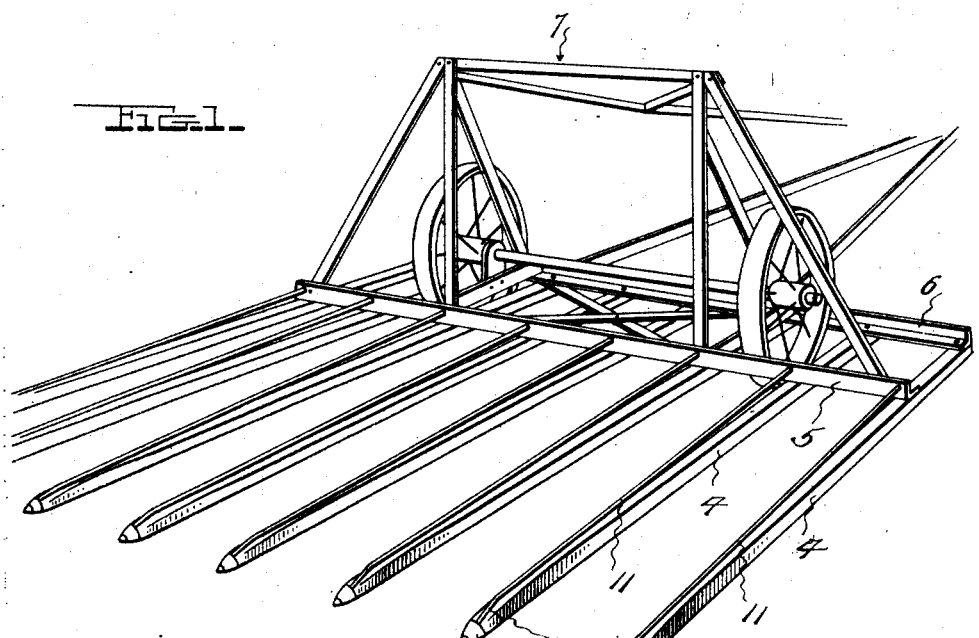
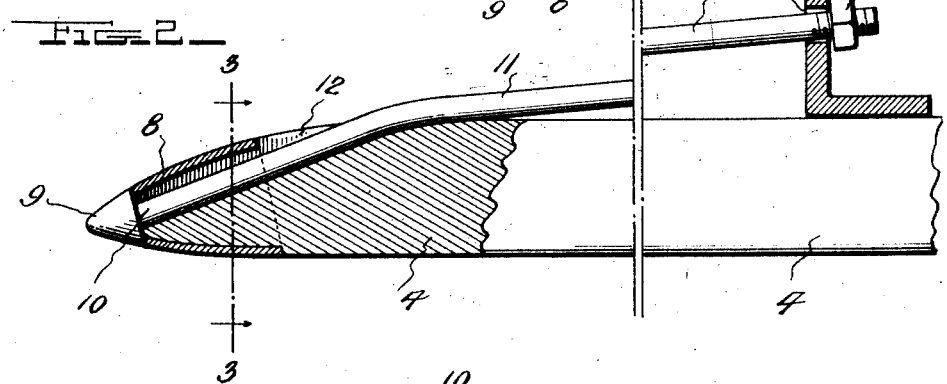
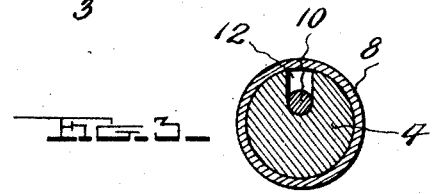
Inventor
C. Christiansen
Witness Patented Aug. 6, 1929.

1,723,467

UNITED STATES PATENT OFFICE.

CHRISTIAN CHRISTIANSEN, OF FARGO, NORTH DAKOTA.

TINE-REENFORCING MEANS.

Application filed April 30, 1928. Serial No. 274,096.

The invention relates to tines such as those of hay sweeps and hay stackers, and it aims to make novel provision for holding such tines against sagging or downward springing and for reenforcing their front ends against wear and splitting.

With the foregoing in view, the invention resides in the novel subject matter hereinafter described and claimed, description being accomplished by reference to the accompanying drawing.

Fig. 1 is a perspective view of the greater portion of a hay sweep showing the invention.

Fig. 2 is a longitudinal sectional view partly broken away and partly in elevation.

Fig. 3 is a transverse sectional view on line 3—3 of Fig. 2.

In the drawing above briefly described, the numerals 4 designate the tines of a hay sweep, the front ends of these tines being pointed while their rear ends are secured to angle metal bars 5 and 6 forming part of a frame structure 7 which is tiltable to raise and lower the tines, in the usual way. All of the tines are provided with reenforcing means constructed in accordance with the present invention, and as such means is the same for all tines, it will be described in connection with one only.

Snugly surrounding the pointed front end of the tine 4, is a metal ferrule 8 which is forwardly tapered, the front end of said ferrule being closed by a forwardly tapered, substantially conical head 9 which is preferably separate therefrom. The front end 10 of a longitudinal rod 11 passes through the front portion of the tine 4, within the ferrule 8, and is connected with the head 9, being preferably integral with the latter. In the preferred construction, the front portion of the tine 4 is formed with a longitudinal groove 12 which receives the front end 10 of the rod 11.

The rear end of the rod 11 passes through an opening 13 in the bar 5 and is provided with an abutment, preferably in the form of a nut 14, contacting with the rear side of said bar. This rear end of rod 11 is upwardly spaced from the tine 4 and hence the rod holds said tine against downward springing or sagging, and if the nut 14 be tightened, the tine will be raised to any desired extent, to aline it with the other tines.

It will be seen from the foregoing that simple and inexpensive provision has been made for effectively holding the tines against downward springing or bowing, and for armoring their front ends with metal to prevent possible wear and splitting. The details disclosed are preferably followed, but within the scope of the invention as claimed, variations may be made.

I claim:—

1. In combination with a tine and a member at the rear end of said tine fixed with respect thereto; a rod extending longitudinally of said tine and converging forwardly therewith, the front end of said rod passing obliquely through the front end of the tine and being provided with a forwardly tapered head constituting a protecting point for said tine, the rear end of said rod being anchored to said fixed member.

2. In combination with a tine and a member at the rear end of said tine fixed with respect thereto; a rod extending longitudinally of said tine and converging forwardly therewith, the front end of said rod passing obliquely through the front end of the tine and being provided with a forwardly tapered head constituting a protecting point for said tine, the rear end of said rod extending through said fixed member and having an adjusting nut contacting with the rear side of said fixed member.

3. In combination with a tine and a member at the rear end of said tine fixed with respect thereto; a metal cap on the front end of said tine, and a rod extending rearwardly and upwardly from said cap and anchored to said fixed member.

4. In combination with a tine and a member at the rear end of said tine fixed with respect thereto; a forwardly tapered ferrule surrounding the front end of said tine, a forwardly tapered head closing the front end of said ferrule, and a rod extending longitudinally of said tine and converging forwardly therewith, the front end of said rod passing through said tine within said ferrule and being connected with said forwardly tapered head, the rear end of said rod being anchored to said fixed member.

5. In combination with a tine and a member at the rear end of said tine fixed with respect thereto; a forwardly tapered ferrule surrounding the front end of said tine, a forwardly tapered head closing the front end of said ferrule, and a rod extending longitudinally of said tine and converging forwardly therewith, the front end of said rod passing through said tine within said ferrule and being connected with said forwardly tapered head, the rear end of said rod extending through said fixed member and having an adjusting nut contacting with the rear side of the latter.

In testimony whereof I have hereunto affixed my signature.

CHRISTIAN CHRISTIANSEN.